United States Patent Office 3,461,073
Patented Aug. 12, 1969

3,461,073
EXOTHERMIC COMPOSITION AND
METHOD OF USE
Charles J. Crowell, Jr., 335 Cascade, and Kenneth N.
Tinklenaugh, 608 W. Palm Drive, both of Oxnard,
Calif. 93030
No Drawing. Filed Sept. 29, 1966, Ser. No. 583,501
Int. Cl. C09k 3/00, 3/02, 3/18
U.S. Cl. 252—70   7 Claims

ABSTRACT OF THE DISCLOSURE

A nontoxic exothermic chemical composition which when applied to living tissue will produce heat when mixed with water thus protecting aviators, divers and others against unsafe environmental temperature conditions.

---

The invention described herein may be manufactured and used by or for the Government of the United States of America for governmental purposes without the payment of any royalties thereon or therefor.

This invention relates to the provision of heat by exothermic means for the purpose of heating or warming an article or body, and particularly to the use of an exothermic composition adjacent a living body so that heat released by the composition will warm the body.

There are many situations and/or circumstances under which an efficient, compact and convenient source of exothermic heat is greatly desired for any of a large number of purposes or applications. For example, such an exothermic source of heat is greatly needed for use by wet suit divers, downed aviators, arctic explorers, and the like. Although the prior art describes many devices or means for supplying heat electrically, chemically or physically to the human body in cold or submerged environments, such prior are devices or means have not been widely used, or have not been generally successful because they usually are unduly bulky, cumbersome, heavy or awkward in use. Electrical devices, for instance, often involve the use of heavy batteries and cumbersome wires and connections. Prior are exothermic devices often involve the use of bulky, heavy, cumbersome or awkward auxiliary garments, suits, equipment, etc., and often are very inefficient and short-lived in their provision of useful heat.

Accordingly, it is a primary object of the invention to provide an exothermic composition which can be used adjacent a living body to release heat to warm the body upon the gradual addition of water to the exothermic composition.

Another objection of this invention is to provide an efficient and convenient method for providing heat exothermically to a living body from a compact, light-weight source of exothermic heat.

A further object of this invention is to provide an exothermic composition in the form of a cream, or other suitable form, in which it can be applied to a living body to release heat to warm the body.

Additional objects of the invention will become apparent from the following description, which is given primarily for purposes of illustration, and not limitation.

Stated in general terms, the objects of the invention are attained by providing an exothermic composition having a suitable consistency, such as the consistency of a cream, paste, putty, etc., for application adjacent to, or directly upon a living body. The exothermic composition is made to include a material which, upon being mixed with water, an aqueous fluid or mixture or an aqueous solution, generates heat and is termed herein as a heat generating substance. The heat generating substance can for example, be a salt, oxide, hydride, metal, acid, base, etc., which will release heat upon being contacted by the aqueous medium. The heat generating substance generally is present in the amount of from about 30 to 70 percent by weight of the total composition. Also included in the exothermic composition is an oleaginous material or materials, such as a mineral or vegetable oil, wax gum, or resin, or a synthetic oil, etc. The relative amounts of the heat generating substance and the oleaginous materials employed in the exothermic composition are determined by the consistency desired in the cream, paste, putty, etc., exothermic composition. Small amounts of surface active agents, such as soaps, detergents, wetting agents, and the like, can be included in the exothermic composition so that the aqueous medium can be added to the exothermic composition slowly, or in small increments, and readily mixed into the exothermic composition to continuously, or intermittently produce desired amounts of heat. The amount of surface active agent generally ranges from about 0.1 to about 2.0 percent. In addition, small amounts of a polyethylene glycol, glycol, glycerine or other suitable higher alcohol or polyol can be included in the exothermic composition to make it more compatible with the aqueous medium. The amount of higher alcohol or polyol can range from about 1.0 to about 10 percent of the total composition.

A more detailed description of specific embodiments of the invention is given below with reference to several specific examples thereof.

EXAMPLE 1

From about 30 to about 70 percent by weight, based upon the exothermic composition, of a pulverulent heat generating substance, such as anhydrous calcium chloride, anhydrous calcium oxide, iron turnings and aluminum iron chloride powder and sodium carbonate, or the like, is mixed with from about 1.0 to about 10 percent by weight of the composition of polyethylene glycol having a molecular weight in the range of about 4000 to 9000; from about 1.0 to about 10 percent by weight of the composition of gum arabic; from about 0.1 to about 2.0 percent by weight of the composition of a soap, such as sodium oleate, sodium stearate, sodium palmitate, or the like; and the balance of 100 percent by weight of the composition of a mineral or vegetable oil, or synthetic oil, such as olive oil, lubricating oil, linseed oil, cooking oil, or the like, to produce a creamy exothermic composition. The resulting exothermic composition is introduced into the space between the inner and outer walls of a double-walled, or lined, garment such as a diver's or an aviator's or explorer's suit, gloves, boots, or the like, and the garment is donned by the wearer. When the wearer desires heat from the garment, water is admitted to the exothermic composition in the garment in the amount or rate desired and heat is liberated therefrom to suitably warm the wearer.

EXAMPLE 2

A creamy exothermic composition was prepared by mixing 49.7 percent by weight of the composition of −325 mesh anhydrous calcium chloride powder, 4.0 percent by weight of the composition of about 4000 molecular weight polyethylene glycol, 6.0 percent by weight of the composition of gum arabic, 0.3 percent by weight of the composition of sodium oleate, 10.0 percent by weight of the composition of a wetting agent consisting of about 54 percent polyoxyethylene sorbitan monooleate and about 46 percent sorbitan monooleate, and 30.0 percent by weight of the composition of mineral oil. The resulting exothermic cream was introduced, in desired amounts, into a pair of modified diver's rubber gloves. The gloves were provided with several pieces of rubber tubing which extended from the fingers over the back of the hand and through the wrist portion of the back of each glove. It was found that hands wearing the gloves containing the exothermic cream composition could be kept in ice water for many hours by virtue of the heat which was automatically released from the cream composition as water automatically entered the gloves through the pieces of rubber tubing.

EXAMPLE 3

An exothermic cream was formulated to contain 62.0 percent by weight of the total mixture of powdered, −325 mesh anhydrous calcium chloride, 1.0 percent polyethylene glycol of about 4000 molecular weight, 6.0 percent gum arabic, 1.0 percent sodium oleate and 30.0 percent mineral oil. Desired amounts of the cream were introduced into a pair of conventional rubber gloves before the gloves were applied to the hands of a wearer. The wearer was able to keep his hands in ice water in comfort for prolonged periods of time by periodically stretching the gloves away from his wrists to permit controlled amounts of water to leak into the gloves adjacent the hands. By subsequently opening and closing the hands, the water mixed and reacted with the cream to release heat which warmed the hands and prevented them from being chilled by the ice water.

We claim:
1. An exothermic composition for the release of heat to a body adjacent thereto upon the addition of an aqueous fluid to the composition which comprises:
   a heat generating substance selected from the group consisting of anhydrous calcium chloride, anhydrous calcium oxide, iron turnings, aluminum iron chloride powder and sodium carbonate, said heat generating substance being present in the composition in the amount from about 30 to about 70 percent by weight of the composition; and
   an oleaginous material selected from the group consisting of mineral oil and vegetable oil, said oleaginous material being present as the remainder making up the balance of the composition.

2. An exothermic composition for the release of heat to a body adjacent thereto upon the addition of an aqueous fluid to the composition which comprises:
   a heat generating substance selected from the group consisting of anhydrous calcium chloride, anhydrous calcium oxide, iron turnings, aluminum iron chloride powder and sodium carbonate, said heat generating substance being present in the composition in the amount from about 30 to about 70 percent by weight of the composition;
   a soap selected from the group consisting of sodium oleate, sodium stearate and sodium palmitate present in an amount from about 0.1 to about 2.0 percent by weight of the composition; and
   an oleaginous material selected from the group consisting of mineral oil and vegetable oil, said oleaginous material being present as the remainder making up the balance of the composition.

3. An exothermic composition according to claim 2, wherein:
   the heat generating substance is present in the composition in the amount from about 30 to about 70 percent by weight of the composition;
   a polyol selected from the group consisting of polyethylene glycol, glycol and glycerin is present to the extent from about 1 percent to about 10 percent by weight of the composition;
   a soap selected from the group consisting of sodium oleate, sodium stearate and sodium palmitate is present to the extent from about 0.1 percent to about 2 percent by weight of the composition; and
   the oleaginous material is present in the amount of the remainder making up the balance of the composition.

4. An exothermic composition according to claim 2, wherein:
   the heat generating substance is pulverulent anhydrous calcium chloride and is present in the amount from about 30 percent to about 70 percent by weight of the composition;
   polyethylene glycol having a molecular weight of about 4000 to about 9000 is present to the extent from about 1 percent to about 10 percent by weight of the composition;
   gum arabic is present to the extent from about 1 percent to about 10 percent by weight of the composition;
   a soap selected from the group consisting of sodium oleate, sodium stearate and sodium palmitate is present to the extent from about 0.1 percent to about 2 percent by weight of the composition; and
   a mineral oil is present in the amount of the remainder making up the balance of the composition.

5. An exothermic composition according to claim 2, wherein:
   the heat generating substance is pulverulent anhydrous calcium chloride and is present in the amount of about 62 percent by weight of the composition;
   polyethylene glycol having a molecular weight of about 4000 is present in the amount of about 1 percent by weight of the composition;
   gum arabic is present to the extent of about 6 percent by weight of the composition;
   sodium oleate is present to the extent of about 1 percent by weight of the composition; and
   mineral oil is present to the extent of about 30 percent by weight of the composition.

6. An exothermic composition according to claim 2, wherein:
   the heat generating substance is pulverulent anhydrous calcium chloride and is present in the amount of about 49.7 percent by weight of the composition;
   polyethylene glycol having a molecular weight of about 4000 is present in the amount of about 4 percent by weight of the composition;
   gum arabic is present to the extent of about 6 percent by weight of the composition;
   sodium oleate is present to the extent of about 0.3 percent by weight of the composition;
   a wetting agent consisting of about 54 percent polyoxyethylene sorbitan monooleate and about 46 percent sorbitan monooleate is present to the extent of about 10 percent by weight of the composition; and
   mineral oil is present to the extent of about 30 percent by weight of the composition.

7. A method of warming a body which comprises the steps:
   (1) applying to said body an effective amount of an exothermic composition for heating the body having the following formula:
      a heat generating substance selected from the group consisting of anhydrous calcium chloride, anhydrous calcium oxide, iron turnings, aluminum iron chloride powder and sodium carbonate, said heat generating substance being present in the composition in the amount from about 30 to about 70 percent by weight of the composition;
      a soap selected from the group consisting of sodium oleate, sodium stearate and sodium palmitate present in an amount from about 0.1 to about 2.0 percent by weight of the composition; and an oleaginous material selected from the group consisting of mineral oil and vegetable oil, said oleaginous material being present as the remainder making up the balance of the composition;

(2) adding an effective amount of aqueous mixture to said exothermic composition to produce heat by interaction with the heat generating substance for warming the body.

References Cited

UNITED STATES PATENTS

| 3,250,680 | 5/1966 | Menkart et al. | 167—87 |
| 3,341,418 | 9/1967 | Moses et al. | 252—90 X |

LEON D. ROSDOL, Primary Examiner

J. GLUCK, Assistant Examiner

U.S. Cl. X.R.

252—182; 424—70, 73, 147, 168, 366